United States Patent [19]

Daley

[11] 4,186,162
[45] Jan. 29, 1980

[54] METHOD OF MAKING A PLATEN CORE

[76] Inventor: Thomas G. Daley, 9716 Lanesboro Way, Louisville, Ky. 40222

[21] Appl. No.: 896,577

[22] Filed: Apr. 14, 1978

[51] Int. Cl.² .......................................... B29D 27/04
[52] U.S. Cl. .................................. 264/46.5; 101/375; 264/46.6; 264/46.9; 264/261; 264/267; 264/271; 308/20
[58] Field of Search ............ 264/46.5, 46.6, 46.9, 264/261, 267, 271; 308/20; 101/314, 348, 368, 375, 376, DIG. 10

[56] References Cited

U.S. PATENT DOCUMENTS

| | | | |
|---|---|---|---|
| 583,804 | 6/1897 | Holmes | |
| 620,286 | 2/1899 | Dodge | 264/46.9 X |
| 1,555,389 | 9/1925 | Stevens | 264/46.9 X |
| 1,906,738 | 5/1933 | Carroll | 101/375 |
| 2,145,320 | 1/1939 | Shaw | 101/376 X |
| 2,979,779 | 4/1961 | Staak | 264/46.6 |
| 3,011,843 | 12/1961 | Ebersole | 308/20 X |
| 3,267,484 | 8/1966 | Roedder | 264/46.6 X |
| 3,377,949 | 4/1968 | Prince | 101/376 X |
| 3,693,544 | 9/1972 | Trzyna | 101/375 |
| 3,978,181 | 8/1976 | Vahle | 264/46.9 X |
| 4,121,521 | 10/1978 | Gill | 101/348 |

FOREIGN PATENT DOCUMENTS

| | | | |
|---|---|---|---|
| 46-36231 | 10/1971 | Japan | 264/46.5 |
| 1249422 | 10/1971 | United Kingdom | 264/46.6 |

OTHER PUBLICATIONS

Wood, R. N., "Foamed Air Bearing Cylinder," in *IBM Technical Disclosure Bulletin*, vol. 3, No. 10, Mar. 1961, p. 22.

*Primary Examiner*—Philip Anderson
*Attorney, Agent, or Firm*—Charles G. Lamb

[57] ABSTRACT

A method of making a business machine platen core wherein a cylindrical body including a hollow tube extending co-axially thereof is encapsulated with an insulative foam with a pair of opposed plugs inserted in each end thereof.

5 Claims, 2 Drawing Figures

METHOD OF MAKING A PLATEN CORE

BACKGROUND OF THE INVENTION

1. Field of the Invention

This invention relates to business machine platens and more particularly relates to a method of making a platen core for a business machine.

2. Description of the Prior Art

It is well known in the prior art to make platens for business machines and in particular for typewriters which are of the noiseless type. Presently, the most common means for muffling the noise produced by the striking of keys on a business machine platen is to place a hood or shield around the platen to absorb the noise produced by the striking of keys upon the platen. Other means have been tried wherein materials have been utilized in hollow cylinders, but expense with little success in noise reduction has been the result. In the prior art, for example, U.S. Pat. No. 583,804 teaches the use of a solid cork core disposed within a fibrous tube.

SUMMARY OF THE INVENTION

The present invention advantageously provides a straightforward method for making a platen core for business machines. The present invention further provides for a method of making the core for noiseless business machine platens that is inexpensive and easy to make.

Various other features of the present invention will become obvious to those skilled in the art upon reading the disclosure set forth hereinafter.

More particularly, the present invention provides a method for making a business machine platen core including the steps of: inserting one end of an elongated rod into an aperture of a first collar; placing a tubular member onto said rod; inserting said first collar into one end of a cylindrical housing; inserting a first plug into said one end forcing said collar a preselected distance into said cylindrical member; adding a chemical reaction foam mix to said cylindrical member, said mix being added between the outer walls of said tubular member and the inner walls of said cylindrical member; adding a second collar having a centrally disposed opening therein to the opposite end of said cylindrical member, said opening in said second collar receiving the opposite end of said elongated rod; inserting a second plug into said opposite end forcing said collar a preselected distance into said cylindrical member; curing said chemical reaction foam mix; and, removing said plugs and rod from said cylindrical member.

It is to be understood that the description of the examples of the present invention given herinafter are not by way of limitation and various modifications within the scope of the present invention will occur to those skilled in the art upon reading the disclosure set forth hereinafter.

BRIEF DESCRIPTION OF THE DRAWING

Referring to the drawing.

DESCRIPTION OF THE PREFERRED EMBODIMENT

Figure 1:
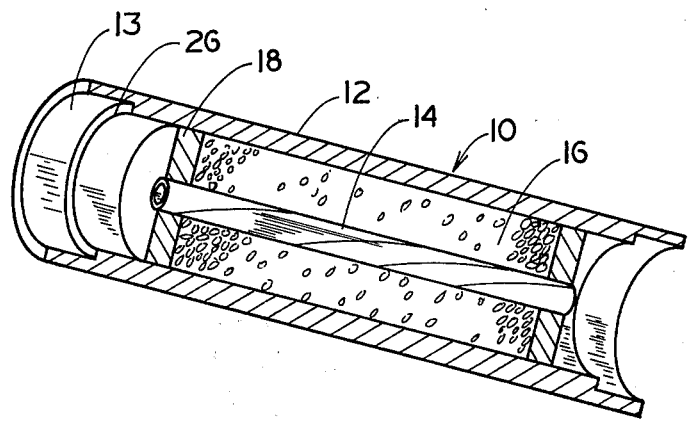
FIG. 1 is a sectional view, in perspective of a preferred platen core of the present invention; and, FIG. 2 is an exploded perspective view of a preferred platen core of the present invention including selective fixtures utilized in making the platen core.

Referring to FIG. 1, there is represented a preferred platen core of the present invention generally designated by the numeral 10. The platen core 10 comprises a cylindrical casing 12 with a shoulder 13 at each end thereof which is generally a plastic, such as, polyvinyl chloride or a metal, such as an extruded aluminum. Disposed co-axially within the casing 12 is a tubular member 14 which has an inner diameter of preselected size to receive a holding rod of a business machine therethrough. The tubular member 14 is generally flexible but has sufficient rigidity so that during the curing operation of the chemical reaction foam mix, to be discussed hereinafter, it will not collapse. Plastic straws, such as those made from polyethylene, have proved to be acceptable. It is also realized that a metallic tube may be used, but generally the cost is much greater than those of plastic straws, and the like.

Disposed within the casing 12 encapsulating the tubular member 14 is an insulating material 16 for absorbing the noise produced by the striking of business machine keys upon the platen. The insulating material 16 encapsulating the tubular member 14 is a foam plastic mixture consisting of a plastic, such as polyurethane, a foaming agent or propellent therefore, and a setting agent, so that the plastic charge foams and rises within the casing 12.

In each end of the casing 12 and at a preselected distance from each end is a cylindrical collar 18. Cylindrical collar 18 is generally a hard plastic material and one preferred collar is a molded polyethylene. Collar 18 is provided with an aperture in the center thereof and the collars 18 receive opposed ends of the tubular member 14 therethrough. Generally, the ends of the tubular member 14 are flush with the outer surface of the collars 18.

Figure 2:
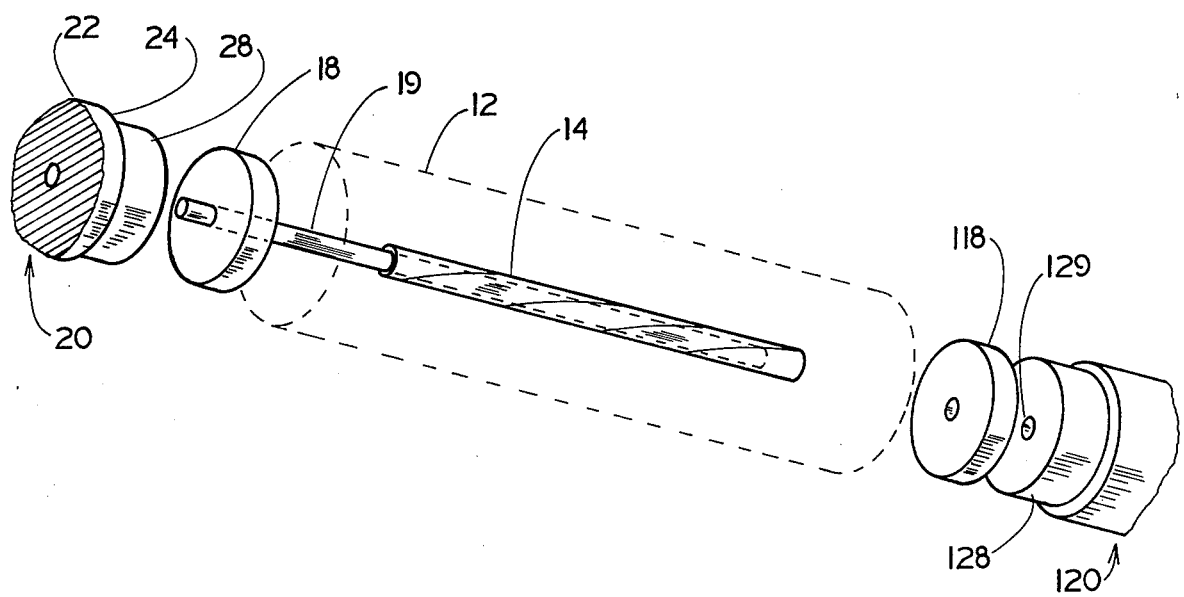

In the making of a platen core 10 of the present invention, as best shown in FIG. 2, a cylindrical collar 18 having a rod 19 therein and a tubular member 14 placed onto the rod 19 is inserted into a casing 12. The diameter of the colar 18 is substantially the same as the inner diameter of the casing 12 thereby providing for a snug fit therein. A plug 20 of preselected configuration is then pushed into the end of the casing 12 where the collar 18 has been inserted forcing the collar 18 a preselected distance therein. The plug 20 is generally of metallic construction machined into two sections, the larger or outer section identifiable by the numeral 22 is cylindrical in shape and has a diameter substantially equal to the inner diameter of the shoulder 13 of the casing 12 so the ledge 24 of the section 22 rests upon the rim 26 when inserted into casing 12. The smaller or inner section identifiable by the numeral 28 has a diameter substantially the same as the inner diameter of the casing 12 so that upon insertion a snug or tight fit is obtained. The length of the section 28 is preselected so that upon contact with the collar 18, collar 18 is pushed to a preselected position within the casing 12. Furthermore, the plug 20 in section 28 includes an aperture 29 therein to receive the rod 19.

When the plug 20 has pushed the collar 18 to its preselected position within casing 12, the cores are usually heated to approximately the temperature at which an insulating foam mix is to be added. The "heating" prevents the metal from "chilling" the reaction and causing a short fill due to the retardation of the reaction.

The insulating foam mix 16 is then sprayed into the interior of the casing 12 from the opposite end between the tubular member 14 and the inner wall of the casing 12. The foam mix is generally a polyurethane mix and the amount used is predetermined for the volume of the cavity to be filled. One preferred foam mix include a mixture of a polyester polyol, and a diisocyanate which are mixed in the spraying section of a spray device which is well known in polyurethane applications. The temperature of spraying is generally from about 45° to 65° C. and for most business machine platens takes less than 0.5 seconds. As soon as the spraying of the mix is complete, a second collar 118 with an aperture therein of substantially the same diameter as the outer diameter of the tubular member 14 is mated onto the tubular member 14. A second plug 120 is then inserted onto the opposite end of the casing 12 forcing the collar 118 a preselected distance therein as described hereinbefore. Heat is then applied to the platen 10 to cause the polyurethane mix to react, thereby forming a foamed plastic therein. Heat applied is generally from about 45° to 65° C. for a period of from about 1 to 4 minutes. During this time period, the polyurethane mix rises creating a uniform foam mix throughout the casing between the collars 18 and 118, encapsulating the tubular member 14. When the cure of the polyurethane foam is complete, plugs 20 and 120 are removed and the platen core 10 is then ready for further processing or fabrication for use as a business machine platen.

It will be realized that various changes may be made to the specific embodiment shown and described without departing from the principles of the present invention described herein.

What is claimed is:

1. A method for making a business machine platen core including the steps of:
    (a) inserting one end of an elongated rod into a centrally disposed opening of a first collar;
    (b) placing a tubular member onto said rod;
    (c) inserting said first collar, rod, and tubular member into one end of a cylindrical housing having openings in each end thereof;
    (d) inserting a first plug into said one end forcing said collar a preselected distance into said cylindrical member;
    (e) adding a foamable thermosetting resin reaction mixture to said cylindrical member, said mixture being added between the outer walls of said tubular member and the inner walls of said cylindrical member;
    (f) adding a second collar having a centrally disposed opening therein to the opposite end of said cylindrical member, said opening in said second collar receiving the opposite end of said elongated rod;
    (g) inserting a second plug into said opposite end of said cylindrical member forcing said collar a preselected distace into said cylindrical member;
    (h) foaming and curing said mixture; and,
    (i) removing said plugs and rod from said cylindrical member.

2. The method of claim 1, said curing of said mixture includes heating said mix to foam about 45° to 60° C. for 1 to 4 minutes.

3. The method of claim 1 wherein said mixture is a formable polyurethane resin reaction mixture; and, said plugs are provided with two sections, a first section configured for being received within said cylindrical member and a second section configured for abutting the ends of said cylindrical member, said first section having a preselected length equal to the preselected distance said collars are forced into said cylindrical member.

4. The method of claim 1 wherein said tubular member is heated prior to the addition of said mixture.

5. The method of claim 4 wherein said tubular member is heated to approximately the temperature at which said mixture is added.

* * * * *